C. JOHNSON.
FAN BELT RETAINING AND TIGHTENING DEVICE.
APPLICATION FILED AUG. 30, 1919.
1,339,893.
Patented May 11, 1920.
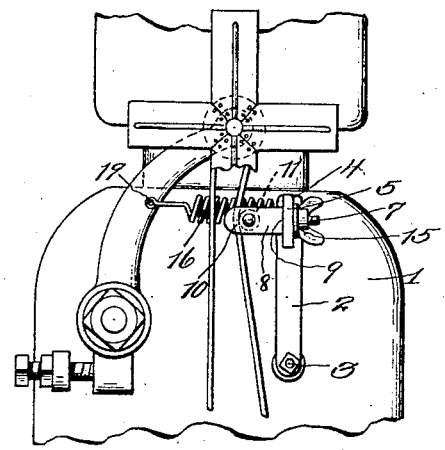
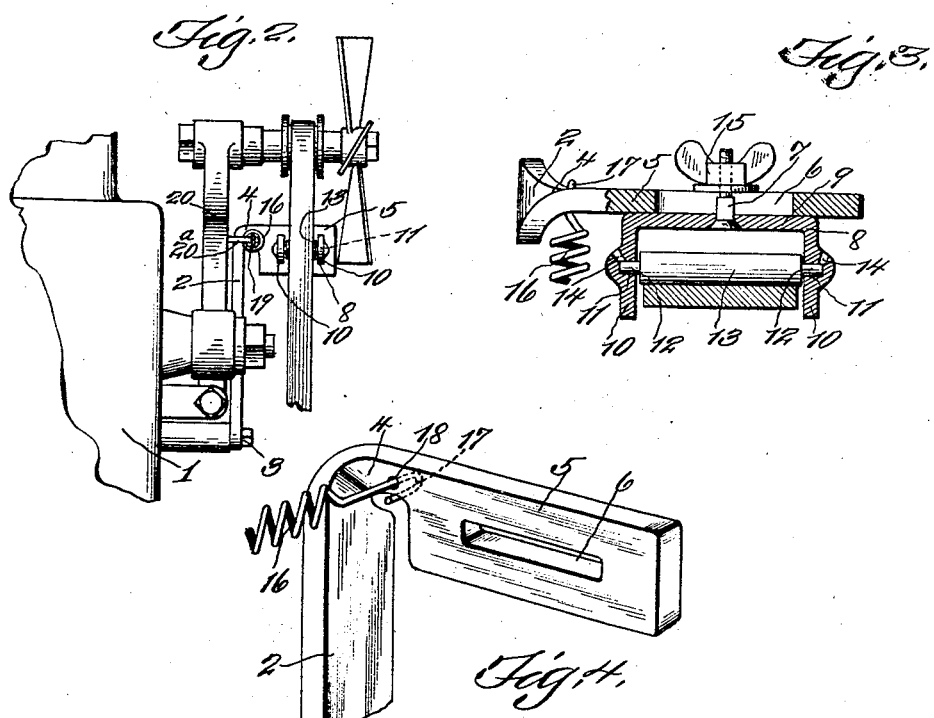
Inventor
Charles Johnson,
By Watson E. Coleman,
Attorney

UNITED STATES PATENT OFFICE.

CHARLES JOHNSON, OF BEDFORD, INDIANA, ASSIGNOR OF ONE-HALF TO WALTER CRAWFORD, OF BEDFORD, INDIANA.

FAN-BELT RETAINING AND TIGHTENING DEVICE.

1,339,893.  Specification of Letters Patent.  Patented May 11, 1920.

Application filed August 30, 1919. Serial No. 320,853.

*To all whom it may concern:*

Be it known that I, CHARLES JOHNSON, a citizen of the United States, residing at Bedford, in the county of Lawrence and State of Indiana, have invented certain new and useful Improvements in Fan-Belt Retaining and Tightening Devices, of which the following is a specification, reference being had to the accompanying drawings.

This invention relates to an improved fan belt retaining and tightening device, and as a primary object of the invention it is the aim to provide a device of this kind, more especially adapted for use in connection with Ford automobiles, and furthermore, to provide a device which is simple, efficient and practical in construction and may be manufactured for a relatively low cost and sold at a reasonable profit.

Another object of the invention is the provision of a device of this kind including means for automatically keeping the belt tight, hence assisting in retaining the belt at all times in engagement with the fan belt pulleys of the fan and engine shafts respectively.

A further object of the invention is the provision of means adjustably mounted upon a support for holding the belt engaging roller, and adapted to be adjusted either toward the engine casing, or toward the radiator, for properly retaining the fan belt at all times in engagement with the pulleys of the fan belt and engine shafts respectively.

While the design and construction at present set forth and illustrated is deemed preferable, it is obvious that as a result of a reduction of the invention to a more practical form for commercial purposes, the invention may be susceptible to changes, and the right of these changes is claimed, provided they are comprehended within the scope of what is claimed.

The invention comprises further features and combination of parts, as will be hereafter set forth, shown in the drawings and claimed.

In the drawings:

Figure 1 is a view in front elevation of the forward part of the engine of the motor casing, illustrating the fan belt shaft carrying arm including the fan belt shaft pulley thereon and the engine shaft, illustrating the improved belt retaining tightening device applied.

Fig. 2 is a view in side elevation of the construction shown in Fig. 1.

Fig. 3 is an enlarged detail view of the fan belt engaging roller and its support, showing the means for supporting the fan belt engaging roller mounting.

Fig. 4 is a detail view in perspective of the bracket for supporting the mounting, which carries the fan belt engaging roller.

Referring more especially to the drawings, 1 designates a portion of an engine casing, preferably of the Ford type, though not necessarily, on which a bracket 2 is pivotally mounted as at 3. This bracket or arm has a twisted part 4, beyond which a plate 5 is formed. The plate 5 has a slot 6, and engaging the slot is a bolt 7, which carries a supporting frame 8. This supporting frame comprises a base 9 and the lateral part 10, in bearings 11 of which pintles 12 of the roller 13 are mounted. The bearings 11 are covered, as shown, there being suitable apertures or orifices 14, through which lubricant may be allowed to enter, for lubricating the bearings of the pintles, whereby the roller may freely turn. By means of the bolt 7, the frame 8 is supported upon the plate 5, and by means of a nut 15 threaded upon the bolt, the frame 8 may be adjusted toward the radiator, or toward the casing of the motor, so as to position the fan belt in such wise relatively to the pulleys of the fan belt and engine shafts respectively, as to retain the belt at all times in engagement with said pulleys. A coil spring 16 is provided, and one end thereof terminates in a hook 17, adapted to engage an aperture 18 of one end of the plate 5, while the other end of the spring terminates in a hook 19, adapted to engage the usual bracket 20, which supports the fan belt shaft.

It will be seen that the bracket or arm 2 is mounted so as to hold the plate 5 and the frame 8, so that the roller 13 may engage one side of the fan belt. By means of the spring 16, tension is urged upon the bracket or arm 2, so as to insure sufficient pressure of the roller 13 on the belt, so as to keep it tight at all times.

This fan belt retaining and tightening device may be applied to any design of machinery, where it is necessary to keep the belt in engagement with the pulley, and to maintain it taut. Furthermore, in applying this device to other machinery, it is obvious that various changes in the minor details may be made.

The invention having been set forth, what is claimed as new and useful is:

1. The combination with a fan belt of an automobile engine, of an arm pivotally mounted upon the engine casing and having at one end a plate, said plate having an elongated slot, a U-shaped frame, means carried thereby engaging said slot for adjustably mounting the frame on the plate, whereby the frame may be adjusted toward and from the engine casing, said frame straddling one side of the fan belt, a roller journaled in said frame, and means connected to the arm and in turn to the fan belt shaft supporting bracket for tensioning the arm, whereby the roller may bear upon and keep the belt tight.

2. The combination with a fan belt of an automobile engine, of an arm pivotally mounted upon the engine casing and having a plate at one end, said plate having a flat face in a plane parallel with one side of the fan belt, a U-shaped frame mounted upon the flat face of the plate for adjustment in a plane toward and from the engine casing and having its arms overlying opposite edges of one side of the fan belt, whereby the belt may be adjusted relative to its pulley to insure holding the belt in proper engagement with said pulley, a roller journaled in the arms of said U-shaped frame to bear against one side of the belt, and means connecting with the arm and in turn to the fan belt shaft supporting bracket for urging the arm toward said bracket, whereby the roller may bear upon and keep the belt tight.

In testimony whereof I hereunto affix my signature.

CHARLES JOHNSON.